United States Patent [19]

Doddapaneni

[11] Patent Number: 4,710,437
[45] Date of Patent: Dec. 1, 1987

[54] HIGH RATE METAL OXYHALIDE CELLS

[75] Inventor: Narayan Doddapaneni, Glenside, Pa.

[73] Assignee: Honeywell Inc., Minneapolis, Minn.

[21] Appl. No.: 818,072

[22] Filed: Jan. 13, 1986

Related U.S. Application Data

[63] Continuation of Ser. No. 652,362, Sep. 19, 1984.

[51] Int. Cl.$^4$ ............................................. H01M 10/36
[52] U.S. Cl. ..................................... 429/101; 429/43; 429/196
[58] Field of Search .......................... 429/43, 101, 196

[56] References Cited

U.S. PATENT DOCUMENTS

| | | | |
|---|---|---|---|
| 3,595,702 | 7/1971 | Krey | 136/137 |
| 4,128,702 | 12/1978 | Okaniwa et al. | 429/27 |
| 4,181,779 | 1/1980 | Teo | 429/199 |
| 4,252,875 | 2/1981 | Venkatasetty | 429/196 |
| 4,293,623 | 10/1981 | Klemann et al. | 429/194 |
| 4,393,125 | 7/1983 | Skarstad et al. | 429/105 |
| 4,405,693 | 9/1983 | Doddapaneni | 429/101 |
| 4,469,763 | 9/1984 | Walsh et al. | 429/101 |

OTHER PUBLICATIONS

Jahnke, et al; Organic Dyestuffs as Catalysts for Fuel Cells, Topics in Current Chemistry 61, 133 (1970).

Primary Examiner—Donald L. Walton
Attorney, Agent, or Firm—Chuck G. Mersereau

[57] ABSTRACT

Improved catalysts for the reduction of oxyhalide depolarizers such as $SOCl_2$ and $SO_2Cl_2$ in active-metal non-aqueous cells are provided which are easier to prepare and less expensive than phthalocyanine complexes and which are generally more stable in the cell environment. These catalysts include certain macrocyclic complexes of Schiff's base prepared by the reaction of an aldehyde with a primary diamine. The preferred embodiments include mononuclear metal macrocyclic complexes made from salicylaldehyde and o-phenylenediamine and binuclear metal macrocyclic complexes of 5-methyl isophthalaldehyde and 1,3-diaminopropane.

6 Claims, 4 Drawing Figures

Li/SOCl$_2$ 3-PLATE LAB CELLS W/0.5mm CATHODES,
CONSTANT CURRENT DENSITY OF 9mA/cm$^2$.
1.5M LiAlCl$_4$/SOCl$_2$, 4.5° C.

Li/SOCl$_2$ CELLS W/ 0.5mm CATHODES, CONSTANT CURRENT DENSITY OF 10 mA/cm$^2$. 1.5 M LiAlCl$_4$/SOCl$_2$, 23° C.

Li/SOCl$_2$ 3-PLATE LAB CELLS W/ 0.5mm CATHODES, CONSTANT CURRENT DENSITY OF 9 mA/cm$^2$. 1.5 M LiAlCl$_4$/SOCl$_2$, 4.5° C.

Li/SOCl₂ LAB CELLS W/0.5mm CATHODES.
1.5 M LiAlCl₄/SOCl₂, 23° C.

Li/SOCl₂ CELLS WITH (1.0M AlCl₃ + 0.5M LiAlCl₄)/SOCl₂ AT 30mA/cm².

HIGH RATE METAL OXYHALIDE CELLS

This application is a continuation of application Ser. No. 652,362, filed Sept. 19, 1984 now abandoned.

BACKGROUND OF THE INVENTION

The invention herein described was made in the source of or under a contract or subcontract thereunder with the Department of the Army.

FIELD OF THE INVENTION

The present invention relates generally to the field of non-aqueous electrochemical cells and, more particularly to a class of catalysts for the reduction of oxyhalide depolarizers such as $SOCl_2$ and $SO_2Cl_2$ in such cells.

DESCRIPTION OF THE PRIOR ART

Much work has been done in the field of high energy battery systems utilizing highly reactive anode materials such as alkali or alkaline earth metals in combination with a non-aqueous electrolyte. The electrolyte is normally composed of a solute which is commonly a metal salt or a complex metal salt of the anode metal dissolved in a compatible non-aqueous solvent depolarizer such as $SO_2$, $SOCl_2$, or $SO_2Cl_2$. An inert cathode, usually of carbon black, is also used in such cells.

The potential of electrochemical couples, such as those mentioned above as high rate, high-power batteries, has not been fully realized mainly because of excessive cathode polarization particularly at high discharge rates and low operating temperatures. This causes a deterioration of cell performance after a short period of operation. For this reason, much research has been conducted concerning the development of additives such as catalysts to reduce the cathode depolarizer, thereby improving the rate capability of the cathodes.

Some improvement in the rate capability of these carbon cathodes has been achieved by doping them with metals such as platinum or metal halides. However, high amounts of the metals or metal halides are required to effectively increase the rate capability of cells such as $Li/SOCl_2$ cells. Also, the cell performance of these dopants deteriorates with thinner electrodes and at the higher temperatures required for certain applications. More recently, metal-phthalocyanine complexes have been shown to possess significant catalytic activity for the electrochemical reduction of solvent depolarizers such as thionyl chloride or sulfural chloride, thereby increasing cell capacity. Examples of such are found in U.S. Pat. Nos. 4,252,875 and 4,405,693. The need still exists for the provision of catalyzed cathodes for cells such as $Li/SOCl_2$ cells which are stable and effective over a wide temperature range and which are sufficiently stable in the cell to be used in both active and reserve configurations.

SUMMARY OF THE INVENTION

By means of the present invention, improved catalysts for the reduction of oxyhalide depolarizes such as $SOCl_2$ and $SO_2Cl_2$ are provided which are easier to prepare and less expensive than phthalocyanine complexes and which are generally more stable in the cell environment. These catalysts include certain marcocyclic complexes of Schiff's base prepared by the reaction of an aldehyde with a primary diamine. The preferred embodiments include mononuclear metal macrocyclic complexes made from salicylaldehyde and o-phenylenediamine of a structure such as

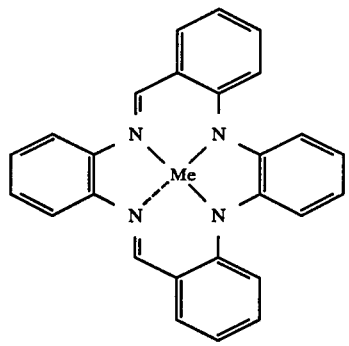

and binuclear metal macrocyclic complexes of 5-methyl isophthalaldehyde and 1,3-diaminopropane having a structure such as

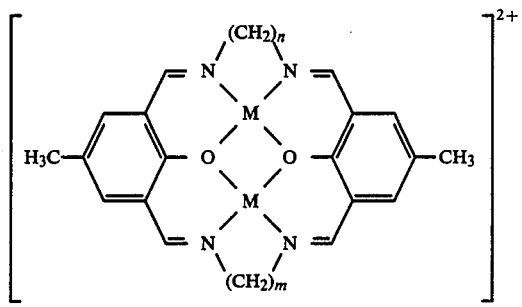

where M or Me represents a metal selected from the group consisting of iron and cobalt and m and n represent integers.

DESCRIPTION OF THE PREFERRED EMBODIMENTS

Catalyst Preparation

Figure 1:
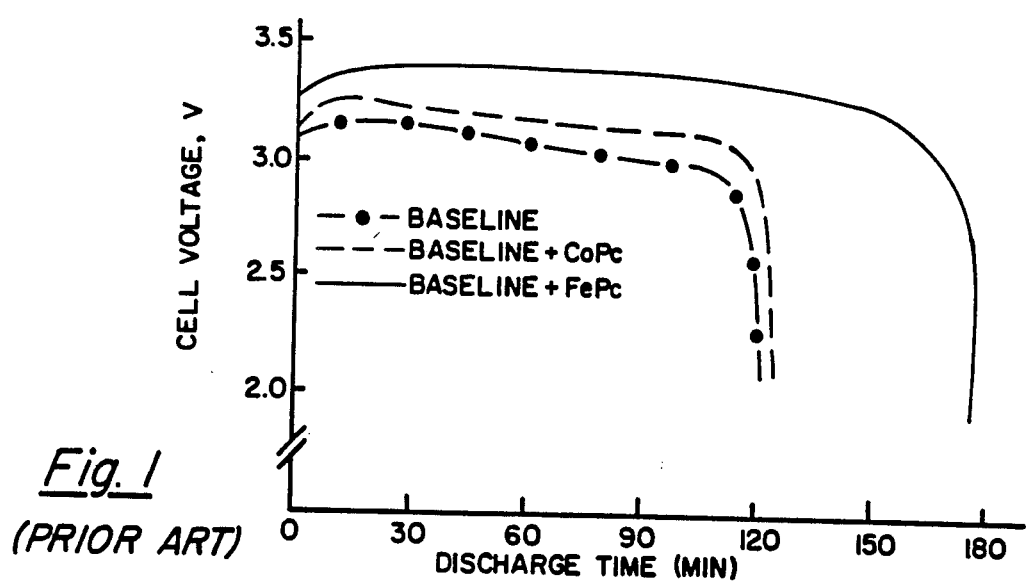
FIG. 1 is a graphical representation of the discharge characteristics of a $Li/SOCl_2$ cell employing prior art catalysts cobalt phthalocyanine (CoPc) and iron phthalocyanine (FePc) dissolved in the electrolyte compared with the uncatalyzed baseline.

The syntheses of FeMac and CoMac were carried out using the method of Pilkington et al, Australian Journal of Chemistry Vol. 23, 2225 (1970). The syntheses of CoSB and FeSB were carried out using a method described in Jahnke et al, Topics in Current Chemistry, Vol. 1, 133 (1979).

EXAMPLE 1

A solution of 5-methyl isophthalaldehyde (0.05 mole) dissolved in the minimum volume of boiling methanol was added to a suspension formed by mixing 1,3-diaminopropane (0.05M) with a saturated solution of cobalt chloride in methanol. The mixture was heated under reflux for 1 hour. Methanol was removed by boiling at atmospheric pressure. The product was poured into ten times its volume of tetrahydrofuran. The product was filtered, washed with water and dried.

EXAMPLE 2

The process of Example 1 was repeated except that iron chloride was substituted for cobalt chloride of Example 1.

The process of Examples 1 and 2 produced binuclear metal marcocyclic complexes CoMac and FeMac, respectively, of the following structure:

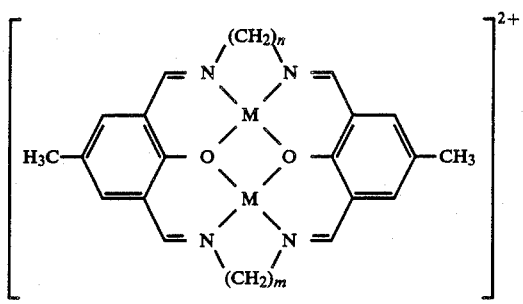

where M represents iron or cobalt and m and n are integers.

EXAMPLE 3

A solution of salicylaldehyde (0.05M), o-phenylenediamine (0.05M) and cobalt acetate (0.025M) was refluxed in ethanol for about 30 minutes. The resulting product was washed with cold methanol and dried at 120° C.

EXAMPLE 4

Example 3 was repeated substituting iron acetate for the cobalt acetate.

The structure of the complexes formed in Examples 3 and 4 known as CoSB and FeSB, respectively, was as follows:

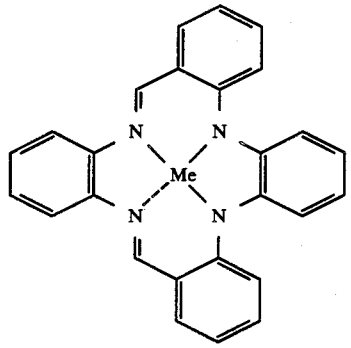

Performance of Catalyst in Cells

Table 1 and 2 show a comparison of discharge characteristics of cells using a prior art catalyst, the catalyst of Example 3, and no catalyst.

TABLE 1

DISCHARGE CHARACTERISTICS OF Li/SOCl$_2$ CELLS WITH VARIOUS CATALYSTS WITH A CONSTANT CURRENT DENSITY OF 30 MA/cm$^2$ AT 23° C.

| Catalyst | Cell Voltage (V) | Discharge Life (Minutes) |
|---|---|---|
| None | 2.92 | 34 |
| Iron Phthalocyanine (FePc) | 3.30 | 52 |
| Mononuclear Couples with Schiff's Base (CoSB) | 3.30 | 70 |

ELECTROLYTE = (0.5 M LiAlCl$_4$ + 1.0 M AlCl$_3$)/SOCl$_2$
CATHODE THICKNESS = 1.0 millimeter

TABLE 2

DISCHARGE CHARACTERISTICS OF Li/SOCl$_2$ CELLS WITH AND WITHOUT COSB COMPLEX AT A CONSTANT CURRENT LOAD OF 10 MA/cm$^2$ AT DIFFERENT OPERATING TEMPERATURES

| Catalyst | −32° C. | | −18° C. | | 23° C. | | 63° C. | |
|---|---|---|---|---|---|---|---|---|
| | Voltage at 50% DOD (V) | DOD (min) | Voltage at 50% DOD (V) | DOD (min) | Voltage at 50% DOD (V) | DOD (min) | Voltage at 50% DOD (V) | DOD (min) |
| None | 2.70 | 55 | 2.80 | 80 | 3.12 | 105 | 3.36 | 164 |
| CoSB | 2.72 | 60 | 2.94 | 90 | 3.39 | 182 | 3.44 | 193 |

Figure 2:
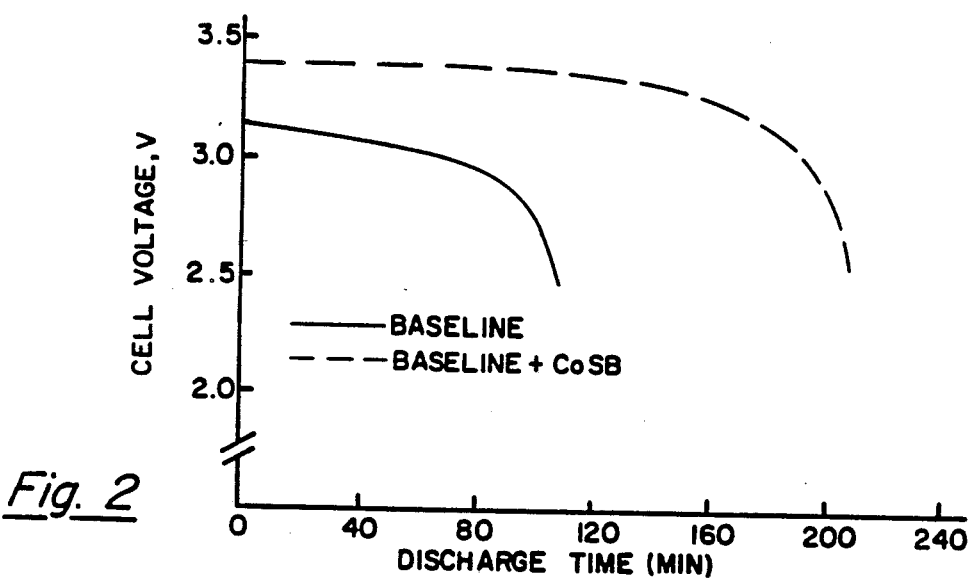
FIG. 2 is a graphical representation showing the discharge characteristics of a $Li/SOCl_2$ cell using mononuclear CoSB catalyst compared with the uncatalyzed baseline.
Figure 3:
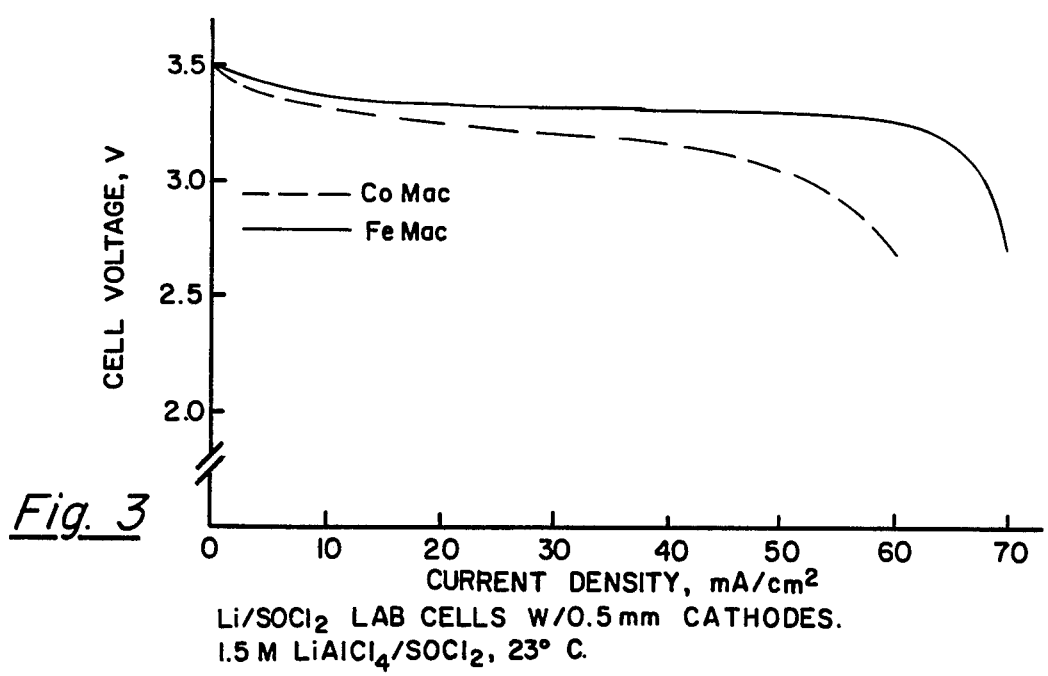
FIG. 3 is a graphical representation of polarization characteristics of a $Li/SOCl_2$ cell using binuclear metal complexes FeMac and CoMac of the invention.
Figure 4:
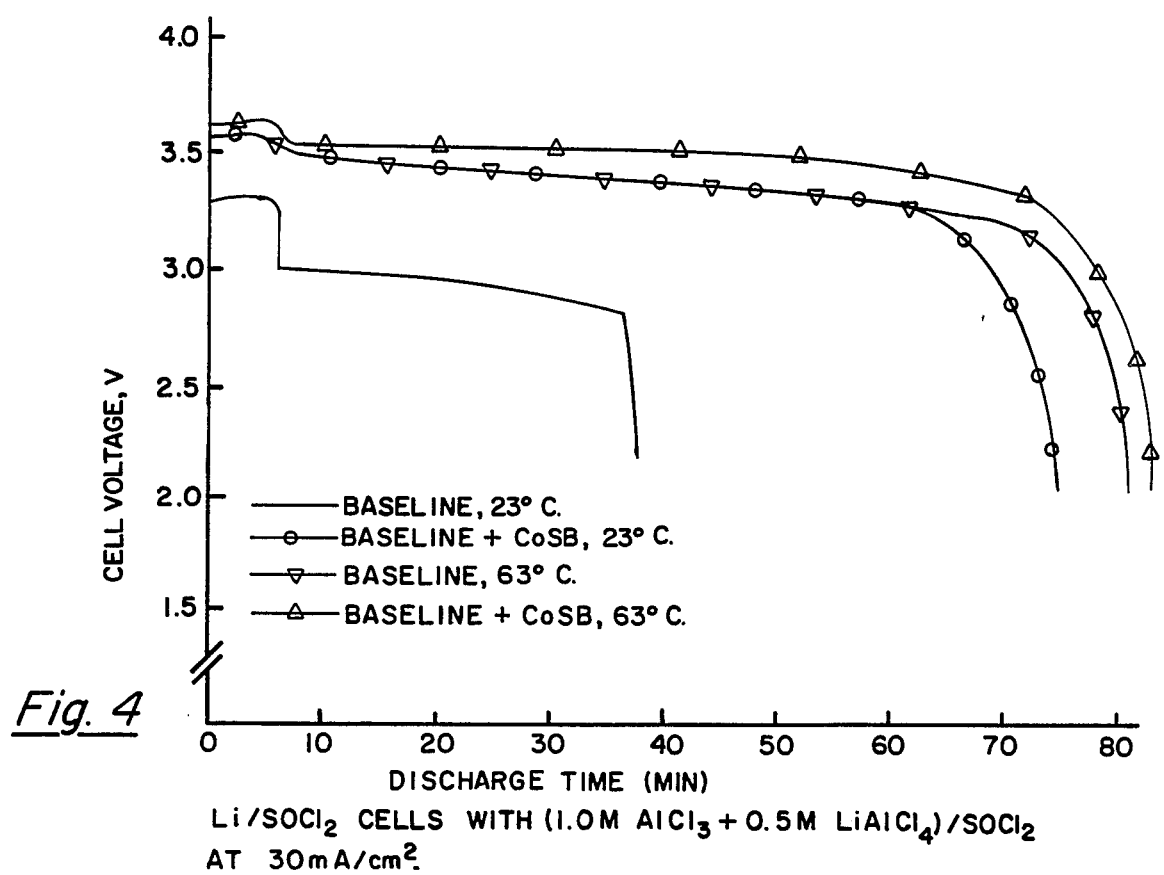
FIG. 4 is a graphical representation of the discharge characteristics of a cell of FIG. 2 at 23° C. and 63° C. with and without CoSB.

FIG. 1 shows the discharge characteristics of prior art cells using cobalt phthalocyanine (CoPc) and iron phthalocyanine (FePc) catalysts dissolved in the electrolyte. It should be noted that the FePc exhibits a somewhat higher catalytic activity. FIGS. 2-4 show data derived using the catalysts of the present invention.

In FIGS. 2-4, the discharge characteristics of Li/SOCl$_2$ cells catalyzed by various metal macrocyclic complexes are compared to an uncatalyzed cell. All catalyzed cells showed substantial improvement in both cell voltage and specific cathode capacity over the uncatalyzed cell. These complexes have shown as good or better catalytic activity for the reduction of SOCl$_2$ than the iron phthalocyanine catalyst. In the case of metal pthalocyanine catalysts, FePc showed the best catalytic activity, whereas, cobalt tetraphenylporphyrin (CoTPP) and cobalt Schiff's base complexes (CoSB) possess superior catalytic activity for SOCl$_2$ reduction than the iron complexes of these macrocyclic rings. Electronic charge density on the central metal ion, extent of orbital overlapping backbonding and the nature of the specific interaction of the complex with the carbon surface, are some of the factors that can influence the catalytic activity of these complexes for the reduction of SOCl$_2$. In the case of the binuclear macrocyclic complexes the iron couples appear to be superior.

Whereas in Examples 1 and 2 the primary diamine utilized was 1,3-diaminopropane, it will be appreciated that other primary alkyl diamine compounds can be used. The reactions of the alkyl diamines are sufficiently similar and well enough understood that such substitutions might well occur to one skilled in the art.

The operating temperature also appears to influence the catalytic activity as shown in Table 2. In general, the cell performance improved with catalyzed cells irrespective of operating temperatures and current densities. At low operation temperatures, however, the catalytic activity of cobalt Schiff's base complex is rather reduced but the significance of this behavior is not yet understood. However, one of the factors could be the specific interaction of the CoSB complex with carbon cathode surface. A better way of impregnating the complex onto carbon should show better results since the performance of cells with this catalyst is drastically improved at high operating temperatures. The catalyst stability is projected to be responsible for the superior performance at high operating temperatures.

The embodiments of the invention in which an exclusive property or right is claimed are defined as follows:

1. In an non-aqueous electrochemical cell system having an active metal anode, a cathode and a non-aqueous electrolyte having an oxyhalide depolarizer, the improvement comprising:
   a catalyst for the reduction of said oxyhalide depolarizer comprising a metal complex of Schiff's base, said Schiff's base being selected from the group consisting of macrocyclic complexes of 5-methyl isophthalaldehyde and 1,3-diaminopropane wherein the metal in said metal complex is selected from the group consisting of iron and cobalt and wherein said metal complex is binuclear.

2. The cell of claim 1 wherein said metal is cobalt.

3. The cell of claim 1 wherein said metal is iron.

4. In a non-aqueous electrochemical cell having a lithium anode, a carbon cathode and a non-aqueous electrolyte comprising LiAlCl$_4$ salt is SOCl$_2$ depolarizer solvent the improvement comprising:
   a catalyst for the reduction of said oxyhalide depolarizer comprising a metal complex of Schiff's base, said Schiff's base being selected from the group consisting of macrocyclic complexes of 5-methyl isophthalaldehyde and 1,3 diaminopropane wherein the metal in said metal complex is selected from the group consisting of iron and cobalt and wherein said metal complex is binuclear.

5. The cell of claim 4 wherein said metal is cobalt.

6. The cell of claim 4 wherein said metal is iron.

* * * * *